(12) United States Patent
Kobayashi

(10) Patent No.: US 10,572,967 B2
(45) Date of Patent: Feb. 25, 2020

(54) IMAGE DATA PROCESSING CIRCUIT AND IMAGING CIRCUIT

(71) Applicant: SONY CORPORATION, Tokyo (JP)

(72) Inventor: Masatsugu Kobayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/064,675

(22) PCT Filed: Oct. 4, 2016

(86) PCT No.: PCT/JP2016/079439
§ 371 (c)(1),
(2) Date: Jun. 21, 2018

(87) PCT Pub. No.: WO2017/122395
PCT Pub. Date: Jul. 20, 2017

(65) Prior Publication Data
US 2019/0012763 A1  Jan. 10, 2019

(30) Foreign Application Priority Data
Jan. 12, 2016 (JP) .................. 2016-003201

(51) Int. Cl.
*G06T 1/20* (2006.01)
*H04N 5/378* (2011.01)
(Continued)

(52) U.S. Cl.
CPC .............. *G06T 1/20* (2013.01); *B60R 1/00* (2013.01); *H04N 5/378* (2013.01); *G06K 9/00369* (2013.01)

(58) Field of Classification Search
CPC ........ G06T 1/20; B60R 1/00; G06K 9/00986; G06K 9/00369; G06K 9/00805; G06K 9/44; H04N 5/378
See application file for complete search history.

(56) References Cited

U.S. PATENT DOCUMENTS

| 6,353,460 | B1 | 3/2002 | Sokawa et al. |
| 2003/0141434 | A1 | 7/2003 | Ishikawa et al. |
| 2017/0237882 | A1* | 8/2017 | Shiohara .............. H04N 5/2254 348/148 |

FOREIGN PATENT DOCUMENTS

| CN | 1230849 A | 10/1999 |
| EP | 0905973 A2 | 3/1999 |

(Continued)

OTHER PUBLICATIONS

International Search Report and Written Opinion of PCT Application No. PCT/JP2016/079439, dated Jan. 10, 2017, 07 pages of ISRWO.

*Primary Examiner* — Ahmed A Berhan
*Assistant Examiner* — Fayez Bhuiyan
(74) *Attorney, Agent, or Firm* — Chip Law Group

(57) ABSTRACT

In a pixel region in a frame of image data, calculation contents are switched over in robustness. An imaging circuit includes an image sensor, a processing element, and an instruction control section. An image sensor generates image data by photoelectrically converting an image signal from an object. A processing element processes line data included in image data in parallel. An instruction control section selects one of a plurality of programs correspondingly to a line count of line data, and supplies an instruction sequence of the selected program to a plurality of processing elements.

8 Claims, 18 Drawing Sheets

(51) Int. Cl.
*B60R 1/00* (2006.01)
*G06K 9/00* (2006.01)

(56) References Cited

FOREIGN PATENT DOCUMENTS

| | | |
|---|---|---|
| JP | 11-112873 A | 4/1999 |
| JP | 2003-218338 A | 7/2003 |
| JP | 2006-293419 A | 10/2006 |

* cited by examiner

FIG. 9

| | |
|---|---|
| Base+OFS_F0 | PROGRAM(F0): GAUSSIAN FILTER |
| +OFS_V0 | ENTRY(v0): |
| +OFS_V1 | ENTRY(v1): |
| Base+OFS_F1 | PROGRAM(F1): SOBEL FILTER |
| +OFS_V0 | ENTRY(v0): |
| +OFS_V1 | ENTRY(v1): |
| Base+OFS_F2 | PROGRAM(F2): SHARPNESS FILTER |
| +OFS_V0 | ENTRY(v0): |
| +OFS_V1 | ENTRY(v1): |
| Base+OFS_F3 | PROGRAM(F3): (THROUGH) |
| +OFS_V0 | ENTRY(v0): |
| +OFS_V1 | ENTRY(v1): |

FIG. 15

| | |
|---|---|
| 0x0000 | PROGRAM(F0): HORIZONTAL DIFFERENCE CALCULATION |
| 0x0040 | ENTRY(v0): SOBEL FILTER |
| 0x0100 | PROGRAM(F1): VERTICAL DIFFERENCE CALCULATION |
| 0x0140 | ENTRY(v0): GAUSSIAN FILTER |

FIG. 16

| | |
|---|---|
| 0x0000 | PROGRAM (F0): HORIZONTAL DIFFERENCE CALCULATION |
| 0x0100 | PROGRAM (F1): VERTICAL DIFFERENCE CALCULATION |
| 0x0200 | PROGRAM (V0): GAUSSIAN FILTER |

IMAGE DATA PROCESSING CIRCUIT AND IMAGING CIRCUIT

CROSS REFERENCE TO RELATED APPLICATIONS

This application is a U.S. National Phase of International Patent Application No. PCT/JP2016/079439 filed on Oct. 4, 2016, which claims priority benefit of Japanese Patent Application No. JP 2016-003201 filed in the Japan Patent Office on Jan. 12, 2016. Each of the above-referenced applications is hereby incorporated herein by reference in its entirety.

TECHNICAL FIELD

The present technology is related to an imaging circuit. For further details, it is related to an image data processing circuit including a plurality of processing elements that processes line data included in image data in parallel, an imaging circuit, and a processing method in these, and a program that makes a computer execute the method.

BACKGROUND ART

Hitherto, various kinds of recognition processing are performed using image data imaged with image sensors. Data flows in a system that performs such recognition processing is broadly divided into a data flow that outputs image data as a display image and a data flow that extracts necessary information from image data and performs recognition processing. In order to display an image, generally, a processing speed of about 30 to 120 fps (frame per sec) is sufficient, but, in order to perform advanced recognition processing, it is insufficient. Then, a vision chip in which a processing element is provided for each pixel of an image sensor has been proposed (for example, refer to Patent Literature 1).

CITATION LIST

Patent Literature

Patent Literature 1: JP 2003-218338A

DISCLOSURE OF INVENTION

Technical Problem

In the above-mentioned conventional technology, by providing a processing element for each pixel of an image sensor, improvement in a frame rate has been aimed. However, in the conventional technology, it is supposed to perform the same image processing calculation for all the pixels in a frame. Accordingly, the calculation contents cannot be switched over in robustness in a pixel region within a frame. Therefore, there is a problem that it cannot cope with uses in which a plurality of sensing calculation results is acquired by following a high-speed frame rate.

The present technology has been created in view of such a situation, and an object is to switch over calculation contents in robustness in a pixel region in a frame of image data.

Solution to Problem

The present technology has been devised to solve the above-described problem, a first aspect thereof is an image data processing circuit including: a plurality of processing elements that processes line data included in image data in parallel; and an instruction control section that selects one of a plurality of programs correspondingly to a line count of the line data and supplies an instruction sequence of the selected program to the plurality of processing elements. With this, action is brought such that different programs are executed for each line of image data.

In addition, according to this first aspect, the instruction control section may supply each independent control signal to the plurality of processing elements. The plurality of processing elements may output an execution result coincident with a control content of the control signal among an execution result of the selected program. With this, action is brought such that different execution results are output for each column of image data.

In addition, according to this first aspect, the instruction control section may include a line condition determining section that determines for each of the line counts with respect to each of the plurality of programs whether to satisfy a condition to supply the instruction sequence, and a line condition selecting section that selects one program in accordance with a predetermined priority order in a case where at least two of the plurality of programs satisfy the condition in the line condition determining section. With this, action is brought such that selection is performed in accordance with a priority order with respect to condition determination on the basis of a line count.

In addition, according to this first aspect, the line condition determining section may perform the determination by using some of bits of the line count expressed with the bits. With this, action is brought such that determination is made on the basis of a condition with regard to some of bits of a line count.

In addition, according to this first aspect, the instruction control section may determine with respect to the line count whether to be within an effective pixel region, and select one of the plurality of programs correspondingly to a determination result. With this, action is brought such that a dedicated program is applied for the outside of an effective pixel region.

In addition, according to this first aspect, the image data may be a frame included in moving image data input in time series. The instruction control section may select one of a plurality of programs correspondingly to a frame count in the moving image data, and supply an instruction sequence of the selected program to the plurality of processing elements. With this, action is brought such that different programs are executed for each frame of image data.

In addition, according to this first aspect, the instruction control section may include a frame condition determining section that determines for each of the frame counts with respect to each of the plurality of programs whether to satisfy a condition to supply the instruction sequence; and a frame condition selecting section that selects one program in accordance with a predetermined priority order in a case where at least two of the plurality of programs satisfy the condition in the frame condition determining section. With this, action is brought such that selection is performed in accordance with a priority order with respect to condition determination on the basis of a frame count.

In addition, according to this first aspect, the frame condition determining section may perform the determination by using some of bits of the frame count expressed with the bits. With this, action is brought such that determination is made on the basis of a condition with regard to some of bits of a frame count.

In addition, a second aspect of the present technology is an imaging apparatus including: an image sensor that generates image data by photoelectrically converting light from an object; and an image data processing circuit including a plurality of processing elements that processes line data included in the image data in parallel, and an instruction control section that selects one of a plurality of programs correspondingly to a line count of the line data and supplies an instruction sequence of the selected program to the plurality of processing elements. With this, action is brought such that different programs are executed for each line of imaged image data.

Advantageous Effects of Invention

According to the present technology, it is possible to attain an excellent effect that calculation contents can be switched over in robustness in a pixel region within a frame of image data. In this connection, effects described here should not be necessarily limited, and may be any of effects described in the present disclosure.

BRIEF DESCRIPTION OF DRAWINGS

FIG. 9 is an illustration showing an example of a program held in an instruction memory 370 in an embodiment of the present technology.

FIG. 15 is an illustration showing the fourth concrete example of program switch-over in an embodiment of the present technology.

FIG. 16 is an illustration showing the fifth concrete example of program switch-over in an embodiment of the present technology.

MODE(S) FOR CARRYING OUT THE INVENTION

Hereinafter, a mode (hereinafter, referred to as an embodiment) for executing the present technology is described. Description is given in the following order.
1. Hardware constitution
2. Relationship between pixel region and program
3. Application example 1. Hardware Constitution

[Entire Constitution]

Figure 1:
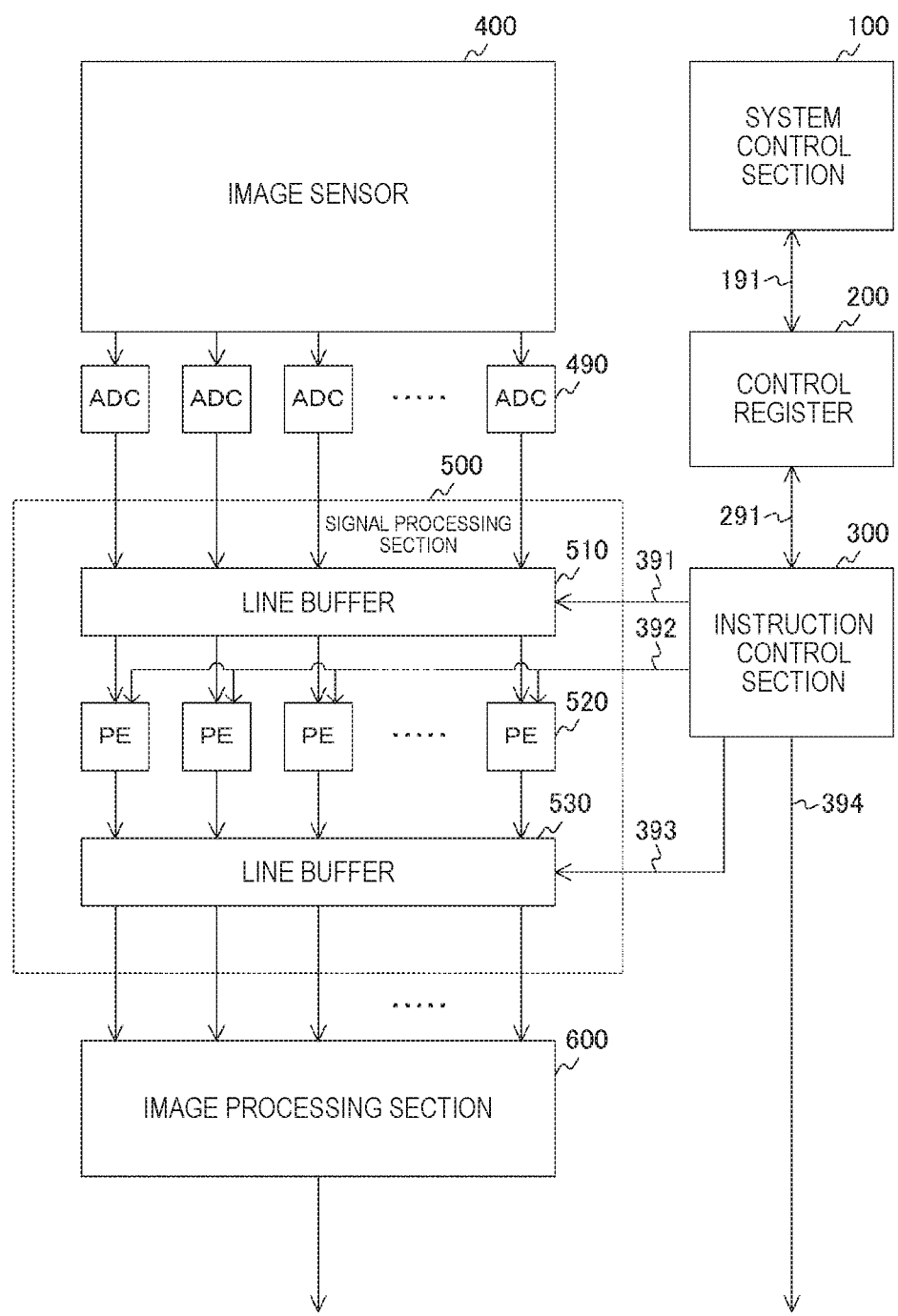
FIG. 1 is a diagram showing an entire constitution example of an imaging circuit in an embodiment of the present technology.

FIG. 1 is a diagram showing an entire constitution example of an imaging circuit in an embodiment of the present technology. This imaging circuit includes a system control section 100, a control register 200, an instruction control section 300, an image sensor 400, a signal processing section 500, and an image processing section 600.

The system control section 100 controls the entire imaging circuit. The control register 200 is a register that holds various settings for controlling the imaging circuit. The system control section 100 controls operation of the imaging circuit by setting values in this control register 200 through a signal line 191.

The instruction control section 300 controls instruction execution in the signal processing section 500. This instruction control section 300 reads out values in the control register 200 through the signal line 291. Then, this instruction control section 300 performs control for the signal processing section 500 through signal lines 391 to 393 in accordance with the values in the control register 200. Moreover, this instruction control section 300 supplies information necessary for processing in a latter stage through a signal line 394.

The image sensor 400 photoelectrically converts light from an object, and generates image data. In order to constitute an imaging apparatus, an optical system, such as a lens, is needed, but detailed description is omitted here. The output of this image sensor 400 is provided with an ADC (Analog-to-Digital Converter) 490 for converting an analog signal into a digital signal. The output of this ADC 490 is supplied to the signal processing section 500.

The signal processing section 500 performs signal processing with respect to image data supplied from the image sensor 400. This signal processing section 500 includes a plurality of processing elements (PE: Processing Element) 520 and line buffers 510 and 530.

The line buffer 510 holds temporarily image data supplied from the image sensor 400, and supplies to the processing elements 520. This line buffer 510 holds the image data in accordance with the control from the instruction control section 300 through the signal line 391. It is supposed that this line buffer 510 holds, for example, about five lines of image data.

With respect to the image data supplied from the image sensor 400, the plurality of processing elements 520 processes line data included in the image data in parallel in the column direction. Each of the plurality of these processing elements 520 performs the instruction sequence of a program supplied through a signal line 392 from the instruction control section 300. In the execution of the program by these processing elements 520, calculation for each of pixels or between pixels is performed. For example, filter processing, such as a Gaussian filter, etc. is supposed. Its calculation results are supplied to the line buffer 530.

The line buffer 530 holds temporarily the calculation results output from the processing elements 520, and supplies to the image processing section 600 in the latter stage. This line buffer 530 performs the holding of image data in accordance with the control from the instruction control section 300 through the signal line 393. It is supposed that this line buffer 530 holds, for example, about two lines of image data.

The image processing section 600 performs image processing for the image data having been subjected to the processing in the signal processing section 500. As the image processing in this image processing section 600, for example, binarization processing for color detection, etc. are supposed. The processing results by this image processing section 600 are used for recognition processing in the latter stage. For example, processing such as tracking a moving object by determining the existence or nonexistence of the moving object is supposed.

[Constitution of Instruction Control Section]

Figure 2:
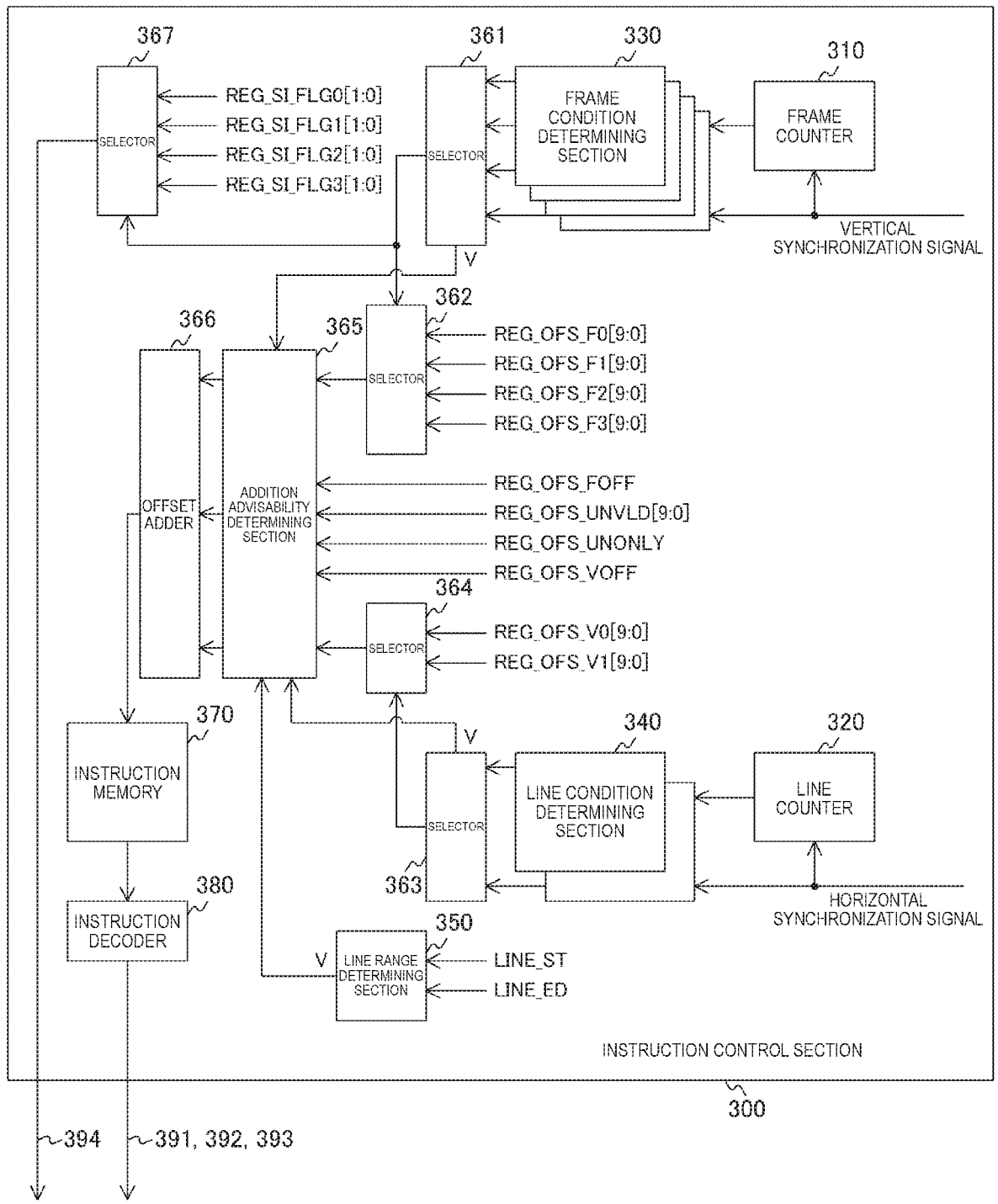
FIG. 2 is a diagram showing one constitution example of an instruction control section 300 in an embodiment of the present technology.

FIG. 2 is a diagram showing one constitution example of the instruction control section 300 in the embodiment of the present technology. This instruction control section 300 includes a frame counter 310, a line counter 320, a frame condition determining section 330, a line condition determining section 340, and a line range determining section 350. Moreover, this instruction control section 300 includes selectors 361 to 364 and 367 and an addition advisability determining section 365. Furthermore, this instruction control section 300 includes an offset adder 366, an instruction memory 370, and an instruction decoder 380.

The frame counter 310 is a counter that counts the frame number of image data becoming a processing target in the processing elements 520. One image data of moving image data input in time series from the image sensor 400 is a frame. A vertical synchronization signal is asserted for each time when one frame is scanned in the image sensor 400, and in accordance with it, this frame counter 310 performs counting one by one.

The line counter 320 is a counter that counts the line number of image data becoming a processing target in the processing elements 520. One frame is scanned in the line (row) direction. For each time when one line has been scanned, a scanning target is advanced by one in the column (column) direction, and the next line is scanned. For each time when one line has been scanned, a horizontal synchronization signal is asserted, and in accordance with it, this line counter 320 performs counting one by one.

The frame condition determining section 330 is provided correspondingly to each of a plurality of programs, and determines in accordance with the value of the frame counter 310 whether or not to satisfy a condition to supply the instruction sequence of its corresponding program to the processing elements 520. That is, this frame condition determining section 330 makes a frame a unit, and determines whether to apply the corresponding program to the frame. In the case of satisfying the condition to supply to the processing elements 520, this frame condition determining section 330 asserts a condition establishment signal, and supplies to the selector 361.

In this embodiment, supposing four programs, four frame condition determining sections 330 are provided. That is, in the case where a condition F0 is established in the first frame condition determining section 330, the program 0 is executed, and in the case where a condition F1 is established in the second frame condition determining section 330, the program 1 is executed. Moreover, in the case where a condition F2 is established in the third frame condition determining section 330, the program 2 is executed, and in the case where a condition F3 is established in the fourth frame condition determining section 330, the program 3 is executed.

In this connection, in this embodiment, it is supposed that the frame condition determining section 330 is provided correspondingly to each of the plurality of programs. However, it may be provided correspondingly to each of a plurality of program entries in one program.

The line condition determining section 340 is provided correspondingly to each of a plurality of program entries, and determines in accordance with the value of the line counter 320 whether or not to satisfy a condition to supply the instruction sequence of its corresponding program entry to the processing elements 520. That is, this line condition determining section 340 makes a line a unit, and determines whether to apply the corresponding program to the line. In the case of satisfying the condition to supply to the processing elements 520, this line condition determining section 340 asserts a condition establishment signal, and supplies to the selector 363.

In this embodiment, supposing two program entries, two line condition determining sections 340 are provided. That is, in the case where a condition V0 is established in the first line condition determining section 340, the program is executed from the program entry 0, and in the case where a condition V1 is established in the second line condition determining section 340, the program is executed from the program entry 1.

In this connection, in this embodiment, it is supposed that the line condition determining section 340 is provided correspondingly to each of the plurality of program entries. However, it may be provided correspondingly to each of a plurality of programs. That is, the program entry means a program in a broad sense.

The line range determining section 350 determines in accordance with the value of the line counter 320 whether the line of image data becoming a processing target in the processing elements 520 is within an effective pixel region. The start line of the effective pixel region is specified in an internal signal "LINE_ST". The end line of the effective pixel region is specified in an internal signal "LINE_ED". In the case where the line of image data becoming a processing target is within the effective pixel region, the line range determining section 350 asserts a valid signal, and supplies to the addition advisability determining section 365.

Upon receipt of condition establishment signals from the four frame condition determining sections 330, the selector 361 selects any one of the conditions. In the case where a condition is established only in the one frame condition determining sections 330, that condition is selected. However, in the case where conditions are simultaneously established in a plurality of the frame condition determining sections 330, it is necessary to select any one of the conditions. This selector 361 selects F0 with the highest priority among the condition establishment signals F0 to F3 from the four frame condition determining sections 330, then F1, the next F2, and finally F3. This selection result is supplied to the selectors 362 and 367. Moreover, in the case where there is even one established condition among the four frame condition determining sections 330, a valid signal is asserted, and supplied to the addition advisability determining section 365. In this connection, the selector 361 is one example of the frame condition selecting section described in claims.

The selector 362 selects an offset of an address to access the instruction memory 370 correspondingly to the four frame condition determining sections 330. This selector 362 selects one of four offset addresses in accordance with a condition establishment signal supplied from the selector 361. That is, in the case where a condition establishment signal F0 is supplied, the value of "REG_OFS_F0" is selected. This "REG_OFS_F0" is a value of 10 bits set in the control register 200, and indicates an offset address in the case where the condition F0 is established. Similarly, in the case where the condition establishment signal F1 is supplied, the value of "REG_OFS_F1" is selected, in the case where a condition establishment signal F2 is supplied, the value of "REG_OFS_F2" is selected, and in the case where a condition establishment signal F3 is supplied, the value of "REG_OFS_F3" is selected. These are also the values set in the control register 200.

Upon receipt of condition establishment signals from the two line condition determining sections 340, the selector 363 selects any one of the conditions. In the case where a condition is established only in the one line condition determining sections 340, that condition is selected. However, in the case where conditions are simultaneously established in the two line condition determining sections 340, it is necessary to select any one of the conditions. This selector 363 selects V0 with the highest priority among the condition establishment signals V0 and V1 from the two line condition determining sections 340, and the next, selects V1. This selection result is supplied to the selector 364. Moreover, in the case where there is even one established condition among the two line condition determining sections 340, a valid signal is asserted, and supplied to the addition advisability determining section 365. In this connection, the selector 363 is one example of the line condition selecting section described in claims.

The selector 364 selects an offset address of a line count to access the instruction memory 370 correspondingly to the two line condition determining sections 340. This selector 364 selects one of two offsets in accordance with a condition establishment signal supplied from the selector 363. That is, in the case where a condition establishment signal V0 is supplied, the value of "REG_OFS_V0" is selected. This "REG_OFS_V0" is a value of 10 bits set in the control register 200, and indicates an offset address in the case where the condition V0 is established. Similarly, in the case where a condition establishment signal V1 is supplied, the value of "REG_OFS_V1" is selected. This "REG_OFS_V1" is also the value set in the control register 200.

The addition advisability determining section 365 determines the advisability of offset address addition. Here, an offset address of a frame count supplied from the selector 362, an offset address of a line count supplied from the selector 364, and an offset address given as "REG_OFS_UNVLD" become a target. The "REG_OFS_UNVLD" is a value of 10 bits set in the control register 200, and indicates an offset address in the case of the outside of an effective pixel region.

Into this addition advisability determining section 365, in addition to the values described so far, the following values set in the control register 200 are input. "REG_OFS_FOFF" is a setting that makes the offset address of a frame count to non-addition in the case where the frame conditions F0 to F3 and the line condition V0 or V1 are established simultaneously. "REG_OFS_VOFF" is a setting that makes the offset address of a line count to non-addition in the case where the frame conditions F0 to F3 and the line condition V0 or V1 are established simultaneously. "REG_OFS_UNONLY" is a setting that makes both the offset address of a frame count and the offset address of a line count to non-addition in the case of the outside of an effective pixel region. In the case where this "REG_OFS_UNONLY" is set, an address designated to "REG_OFS_UNVLD" is referred to. Accordingly, it is useful in the case of unifying and using program calculation necessary for a non-effective pixel region.

Moreover, in the case where a valid signal from the selector 361 is not asserted, this addition advisability determining section 365 makes the offset address of a frame count from the selector 362 to non-addition. Moreover, in the case where a valid signal from the selector 363 is not asserted, the offset address of a line count from the selector 364 is made to non-addition. Furthermore, in the case where a valid signal from the line range determining section 350 is not asserted, the offset address of "REG_OFS_UNVLD" is made to non-addition. As a result of the determination made in this way in the addition advisability determining section 365, a necessary offset address is supplied to the offset adder 366.

The offset adder 366 is an adder that adds the offset address supplied from the addition advisability determining section 365. The offset address having been subjected to the adding by this offset adder 366 is used for the instruction fetch operation in the instruction memory 370.

The selector 367 is a selector that selects the identification information of a program executed correspondingly to the frame conditions F0 to F3. "REG_SI_FLG0" is the identification information of two bits of a program executed at the time of establishment of the condition F0, and is a value set in the control register 200. Similarly, "REG_SI_FLG1" is the identification information of a program executed at the time of establishment of the condition F1, "REG_SI_FLG2" is the identification information of a program executed at the time of establishment of the condition F2, and "REG_SI_FLG3" is the identification information of a program executed at the time of establishment of the condition F3. This selector 367 selects any of the identification information in accordance with the frame condition selected by the selector 361, and outputs to the latter stage through the signal line 394.

The instruction memory 370 is a memory that memorizes the instruction sequence of a program for controlling the signal processing section 500. This instruction memory 370 performs an instruction fetching operation on the basis of an offset address supplied from the offset adder 366, and outputs a fetched instruction to the instruction decoder 380.

The instruction decoder 380 decodes the instruction fetched in the instruction memory 370, and supplies control contents for the signal processing section 500 through the signal lines 391 to 393.

Figure 3:
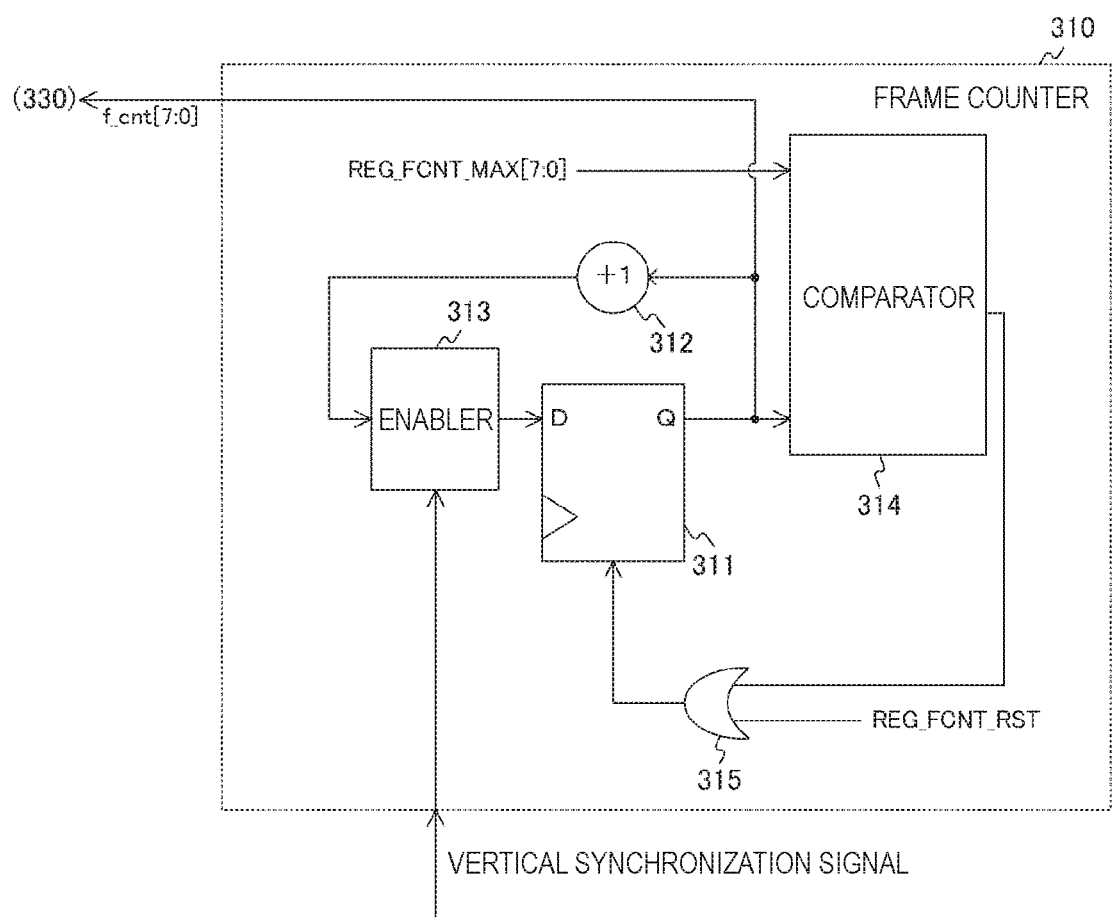
FIG. 3 is a diagram showing one constitution example of a frame counter 310 in an embodiment of the present technology.

FIG. 3 is a diagram showing one constitution example of the frame counter 310 in the embodiment of the present technology. This frame counter 310 includes a flip-flop 311, an adder 312, an enabler 313, a comparator 314, and a logical sum gate 315.

The flip-flop 311 is a flip-flop that holds an input D from the enabler 313 in accordance with clocks, and outputs to an output Q. The adder 312 is an adder that performs an increment operation by adding "1" to the output of the flip-flop 311. The enabler 313 supplies a value supplied from the adder 312 to the input D of the flip-flop 311 during a period when the vertical synchronization signal is being asserted. Therefore, the flip-flop 311 counts one by one for each time when one frame is scanned.

The comparator 314 is a comparator that compares the output Q of the flip-flop 311 with "REG_FCNT_MAX". The "REG_FCNT_MAX" is a value of eight bits set in the control register 200, and sets the maximum value of the frame counter. In the case where the vertical synchronization signal is asserted in a state where the output Q of the flip-flop 311 has reached this maximum value, this frame counter 310 starts recounting from "0".

The logical sum gate 315 is a calculation unit that performs a logical sum calculation for the output of the comparator 314 and "REG_FCNT_RST". The "REG_FCNT_RST" is a value of one bit set in the control register 200, and is a reset signal of the flip-flop 311. Even before the frame counter reaches the maximum value, in the case where this "REG_FCNT_RST" is being set, when the vertical synchronization signal is asserted, the frame counter 310 starts recounting from "0".

This frame counter 310 outputs the output Q of the flip-flop 311 as a value (f_cnt) of eight bits of a frame count.

Figure 4:
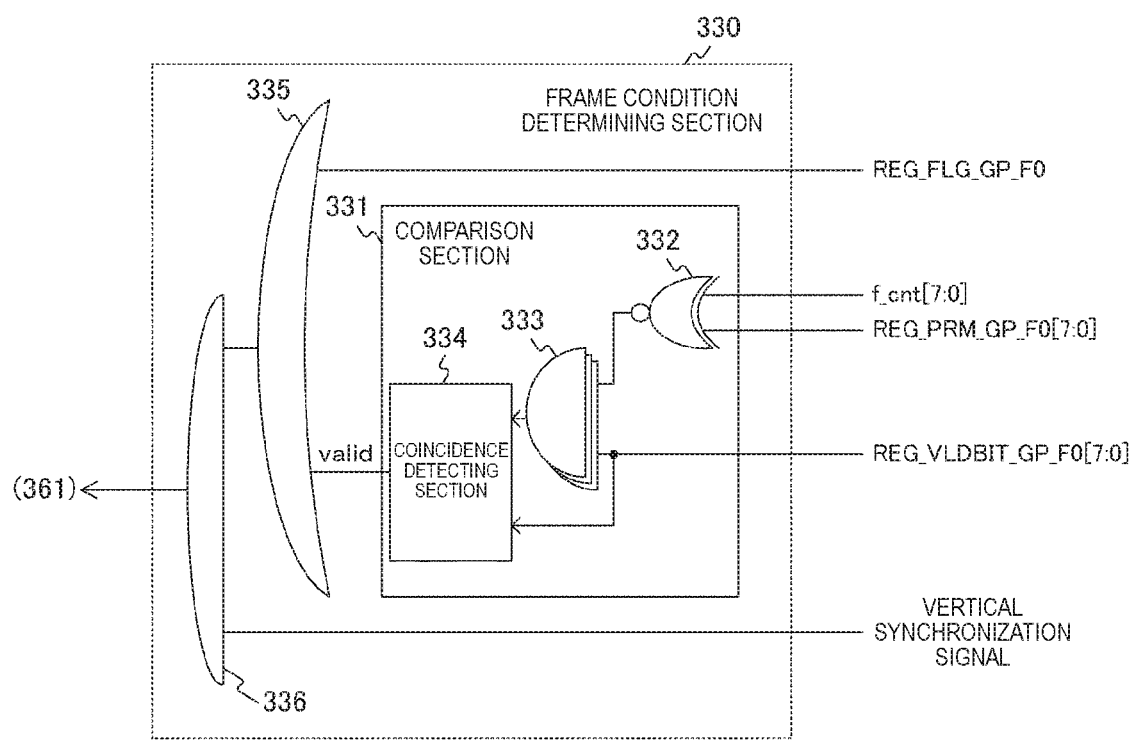
FIG. 4 is a diagram showing one constitution example of a frame condition determining section 330 in an embodiment of the present technology.

FIG. 4 is a diagram showing one constitution example of the frame condition determining section 330 in the embodiment of the present technology. Here, a constitution example of the frame condition determining section 330 that determines the frame condition F0 is shown. The similar matter is applied to the other frame conditions F1 to F3. This frame condition determining section 330 includes a comparison section 331, a logical sum gate 335, and a logical multiply gate 336.

The comparison section 331 performs comparison with respect to a frame count. This comparison section 331 includes a negative exclusive logical sum (XNOR) gate 332, a logical multiply gate 333, and a coincidence detecting section 334.

The XNOR gate 332 detects coincidence between a frame count f_cnt from the frame counter 310 and "REG_PRM_GP_F0". The "REG_PRM_GP_F0" is a value of eight bits set in the control register 200, and sets the condition of a frame count. The XNOR gate 332 performs comparison for a frame count of eight bits in units of a bit.

The logical multiply gate 333 creates the logical multiply of the comparison result of the XNOR gate 332 and "REG_VLDBIT_GP_F0". The "REG_VLDBIT_GP_F0" is a value of eight bits set in the control register 200, and sets a comparison target bit in the comparison section 331. Only a bit becoming a comparison target among eight bits is set to "1", whereby only a bit that is a bit in which a frame count coincides with the condition of "REG_PRM_GP_F0" and becomes a comparison target, is acquired as the output of the logical multiply gate 333. With this, the determination of condition establishment can be performed using some of bits of a frame count.

The coincidence detecting section 334 detects coincidence between the logical multiply gate 333 and "REG_VLDBIT_GP_F0". Only in the case where eight bits of the output of the logical multiply gate 333 and eight bits of "REG_VLDBIT_GP_F0" completely coincide with each other, this coincidence detecting section 334 asserts a valid signal.

The logical sum gate 335 creates the logical sum of the output of the coincidence detecting section 334 and "REG_FLG_GP_F0". The "REG_FLG_GP_F0" is a value of one bit set in the control register 200, and sets compulsorily to the determination of the condition F0 to be valid. That is, in the case where at least one of the case where the complete coincidence has been detected in the coincidence detecting section 334 and a valid signal has been asserted and the case where it has been set compulsorily to be valid by the "REG_FLG_GP_F0" is established, this logical sum gate 335 asserts a valid signal.

The logical multiply gate 336 creates the logical multiply of the output of the logical sum gate 335 and the vertical synchronization signal. That is, this logical multiply gate 336 outputs the establishment of the conditions F0 during a period when the vertical synchronization signal is being asserted.

Figure 5:
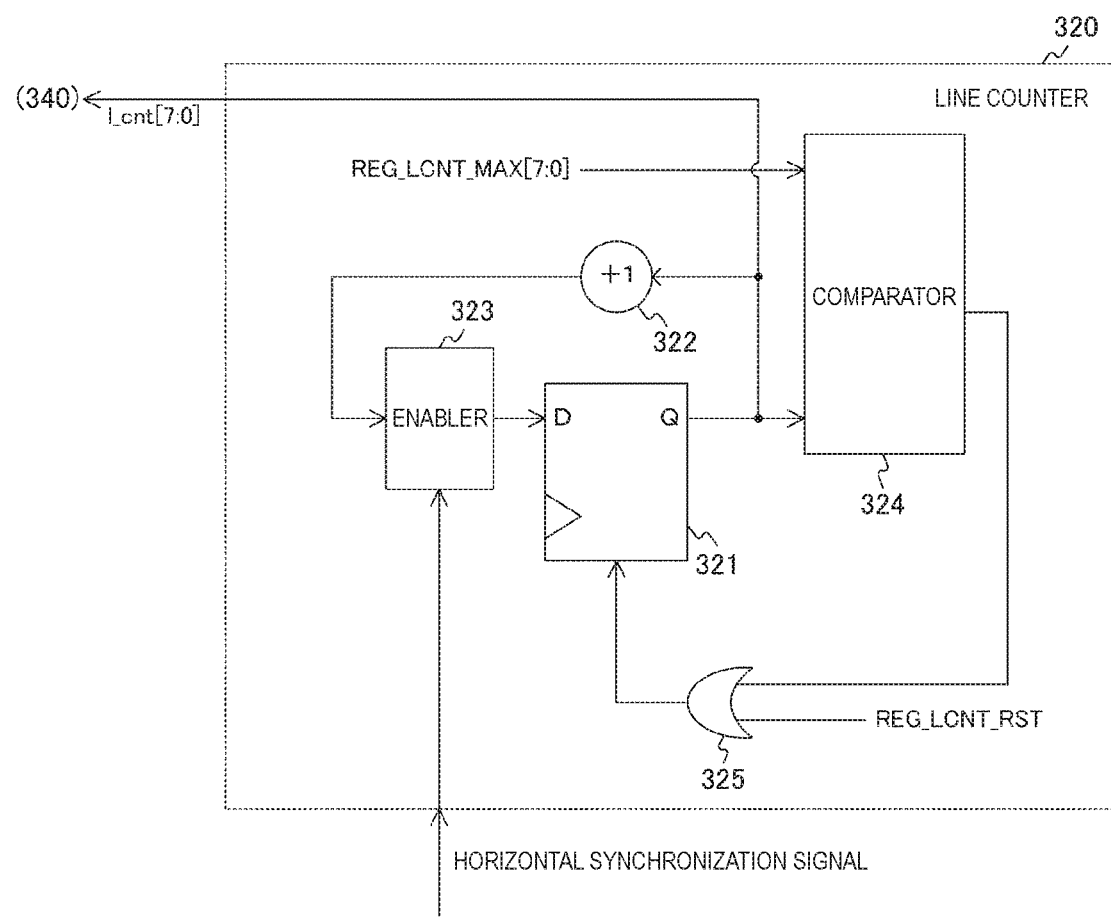
FIG. 5 is a diagram showing one constitution example of a line counter 320 in an embodiment of the present technology.

FIG. 5 is a diagram showing one constitution example of the line counter 320 in the embodiment of a present technology. This line counter 320 has a constitution similar to that of the frame counter 310, and increments a line count in the case where a horizontal synchronization signal is asserted. This line counter 320 outputs the output Q of the flip-flop 321 as a value (1_cnt) of eight bits of a frame count.

"REG_FCNT_RST" is a value of one bit set in the control register 200, and is a reset signal of the flip-flop 321. "REG_FCNT_MAX" is a value of eight bits set in the control register 200, and sets the maximum value of a line counter.

Since the constitution other than this is similar to that of the frame counter 310, detailed description is omitted.

Figure 6:
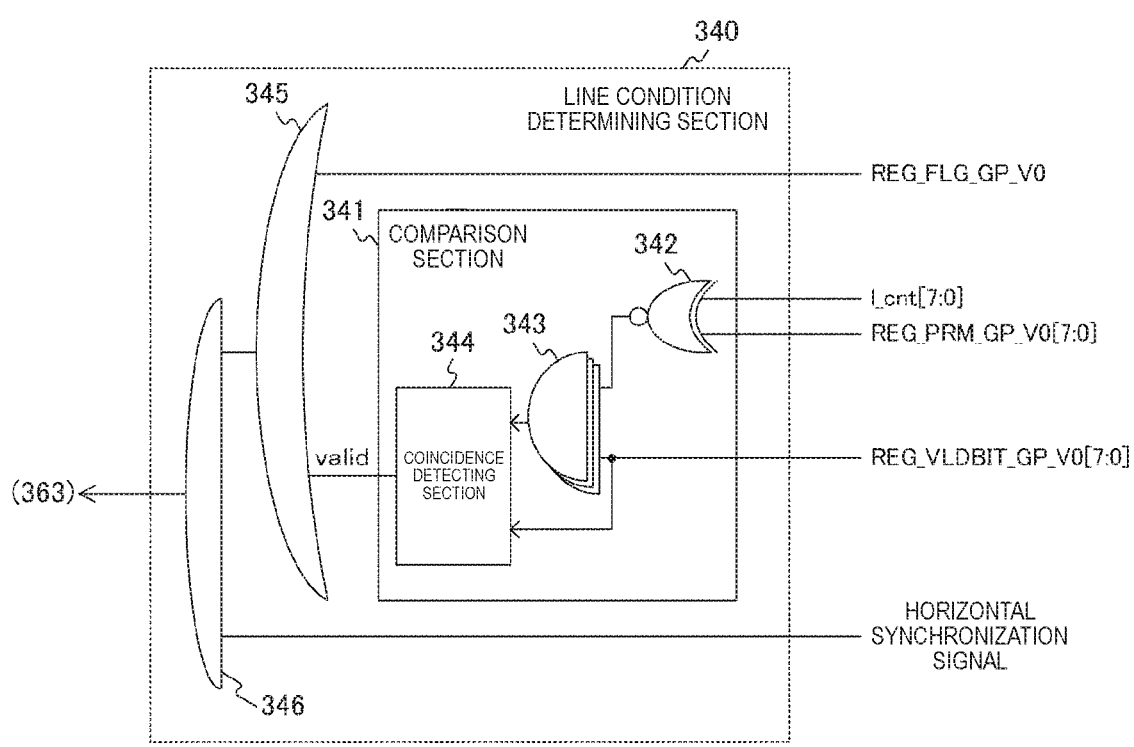
FIG. 6 is a diagram showing one constitution example of a line condition determining section 340 in an embodiment of the present technology.

FIG. 6 is a diagram showing one constitution example of the line condition determining section 340 in the embodiment of the present technology. Here, a constitution example of the line condition determining section 340 that determines a line condition V0 is shown. The similar matter is applied to other line condition V1.

This line condition determining section 340 has a constitution similar to that of the frame condition determining section 330, and outputs the establishment of the condition V0 with respect to a line count 1_cnt from the line counter 320 during a period when the vertical synchronization signal is being asserted.

"REG_PRM_GP_V0" is a value of eight bits set in the control register 200, and sets the condition of the line count. "REG_VLDBIT_GP_V0" is a value of eight bits set in the control register 200, and sets a comparison target bit in the comparison section 341. "REG_FLG_GP_V0" is a value of one bit set in the control register 200, and sets compulsorily the determination of the conditions V0 to be valid.

Since the constitution other than this is similar to that of the frame condition determining section 330, detailed explanation is omitted.

Figure 7:
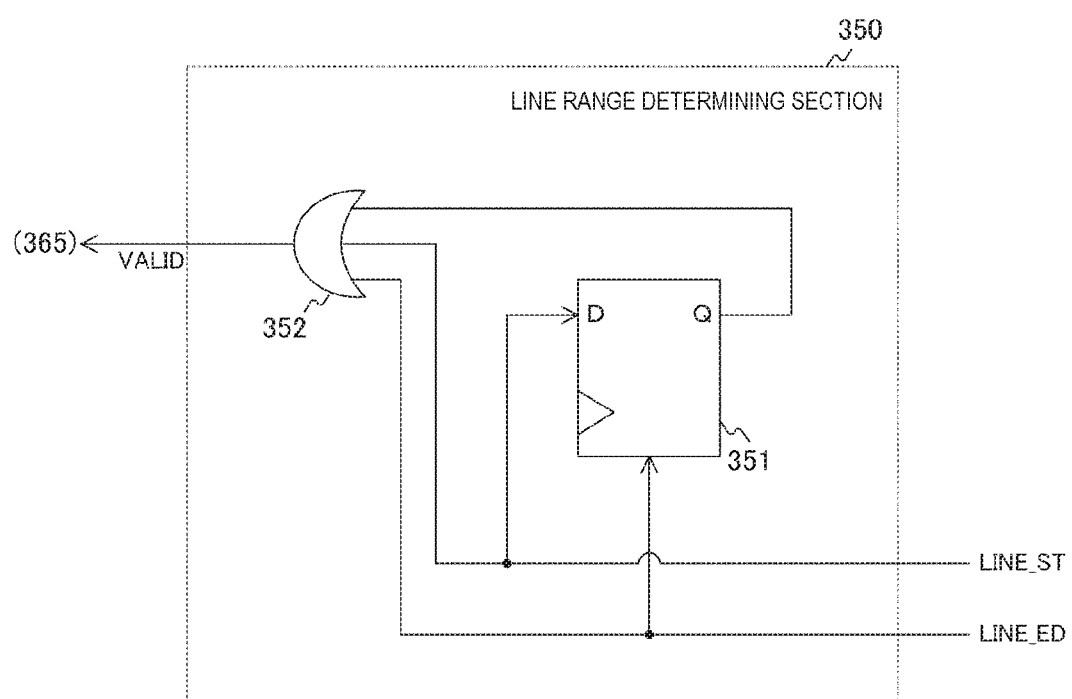
FIG. 7 is a diagram showing one constitution example of a line range determining section 350 in an embodiment of the present technology.

FIG. 7 is a diagram showing one constitution example of the line range determining section 350 in the embodiment of the present technology. This line range determining section 350 includes a flip-flop 351 and a logical sum gate 352.

The flip-flop 351 holds "1" in the case where an internal signal "LINE_ST" that specifies a start line of an effective pixel region is asserted, and is cleared to "0" in the case where an internal signal "LINE_ED" that specifies an end line of the effective pixel region is asserted.

The logical sum gate 352 creates the logical sum of the output of the flip-flop 351 and internal signals "LINE_ST" and "LINE_ED". That is, this logical sum gate 352 asserts and outputs a valid signal in the case where a line becoming a target is included in the effective pixel region.

2. Relationship Between Pixel Region and Program

[Pixel Region]

Figure 8:
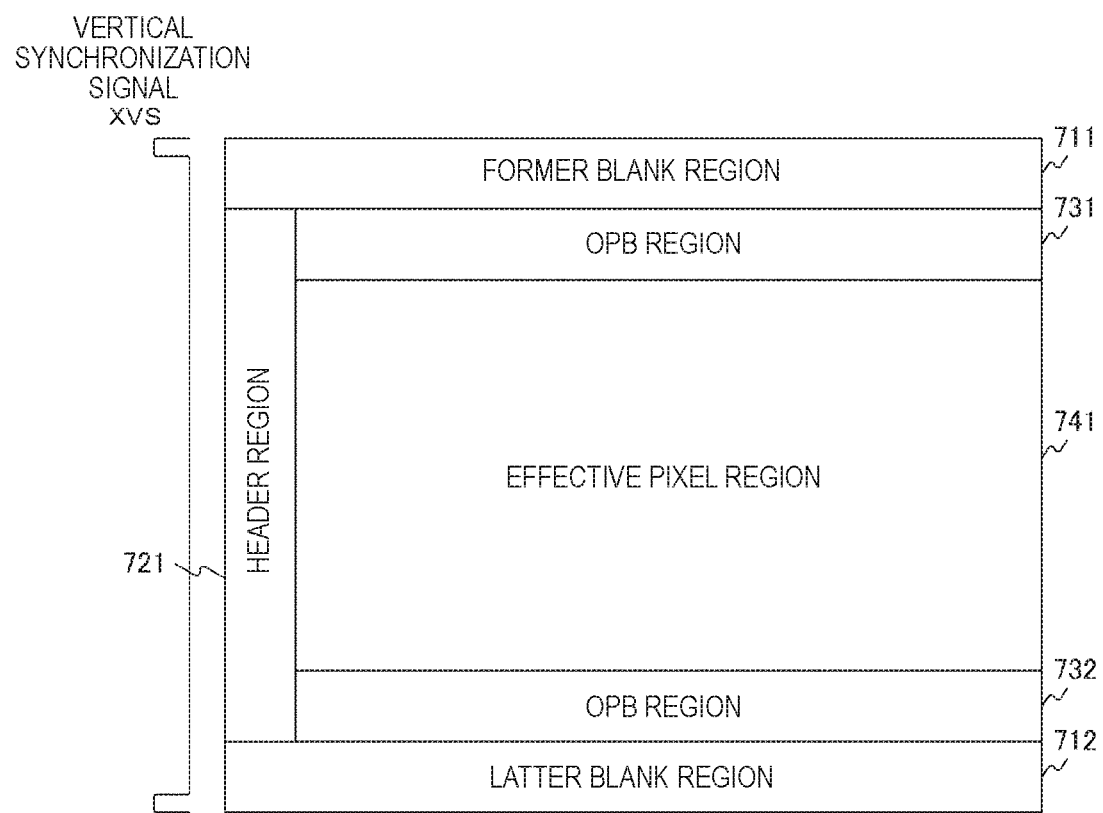
FIG. 8 is an illustration showing an example of a pixel region of a frame becoming a target in an embodiment of the present technology.

FIG. 8 is an illustration showing an example of the pixel region of a frame becoming a target in the embodiment of the present technology. In one frame, scanning is made from the upper left, returned back at the right end, and is shifted to the next line. The uppermost portion of a frame is a former blank region 711, and the lowermost portion is a latter blank region 712. In the former blank region 711 and the latter blank region 712, the vertical synchronization signal of each frame is included. In this embodiment, the vertical synchronization signal is referred to in the frame counter 310.

In a region other than the former blank region 711 and the latter blank region 712, a header region 721 is provided at the head portion of a line. The horizontal synchronization signal of each line is included in this header region 721. In this embodiment, the horizontal synchronization signal is referred to in the line counter 320.

The center of the pixel region is an effective pixel region 741, and serves as a display portion of image data. In this embodiment, the start line of the effective pixel region is specified with the internal signal "LINE_ST", and the end line of the effective pixel region is specified with the internal signal "LINE_ED". In this embodiment, programs or program entries can be switched over in units of a line in the effective pixel region 741.

On the upper and lower portions of the effective pixel region 741, there exist OPB (Optical Black) regions 731 and 732. These OPB regions 731 and 732 are a region for setting the reference of a black level in signal processing. In this embodiment, on the basis of determination results by the line range determining section 350, a dedicated program can be applied to the OPB regions 731 and 732.

[Program]

FIG. 9 is an illustration showing an example of programs held in the instruction memory 370 in the embodiment of the present technology. In this example, four programs corresponding to the four frame conditions F0 to F3 are supposed. Moreover, it is supposed to provide two program entries corresponding to the two line conditions V0 and V1 to the respective programs.

The program corresponding to the frame condition F0 is a program that performs processing with a Gaussian filter with respect to a pixel becoming a target. The program corresponding to the frame condition F1 is a program that performs processing with a Sobel filter with respect to a pixel becoming a target. The program corresponding to the frame condition F2 is a program that performs processing with a sharpness filter with respect to a pixel becoming a target. The program corresponding to the frame condition F3 is a program that does not perform processing with respect to a pixel.

In the case where the frame condition F0 is established, in the instruction memory 370, an address in which the offset address "REG_OFS_F0" is added to the base address, is referred to, and an instruction is fetched. Moreover, in the case where the line condition V0 is further established, an address in which the offset address "REG_OFS_V0" is further added, is referred to. On the other hand, in the case where the line condition V1 is established, an address in which the offset address "REG_OFS_V1" is further added, is referred to.

The similar matter is applied to the case where the frame conditions F1 to 3 are established.

[Switch-Over in Units of Pixel]

Figure 10:
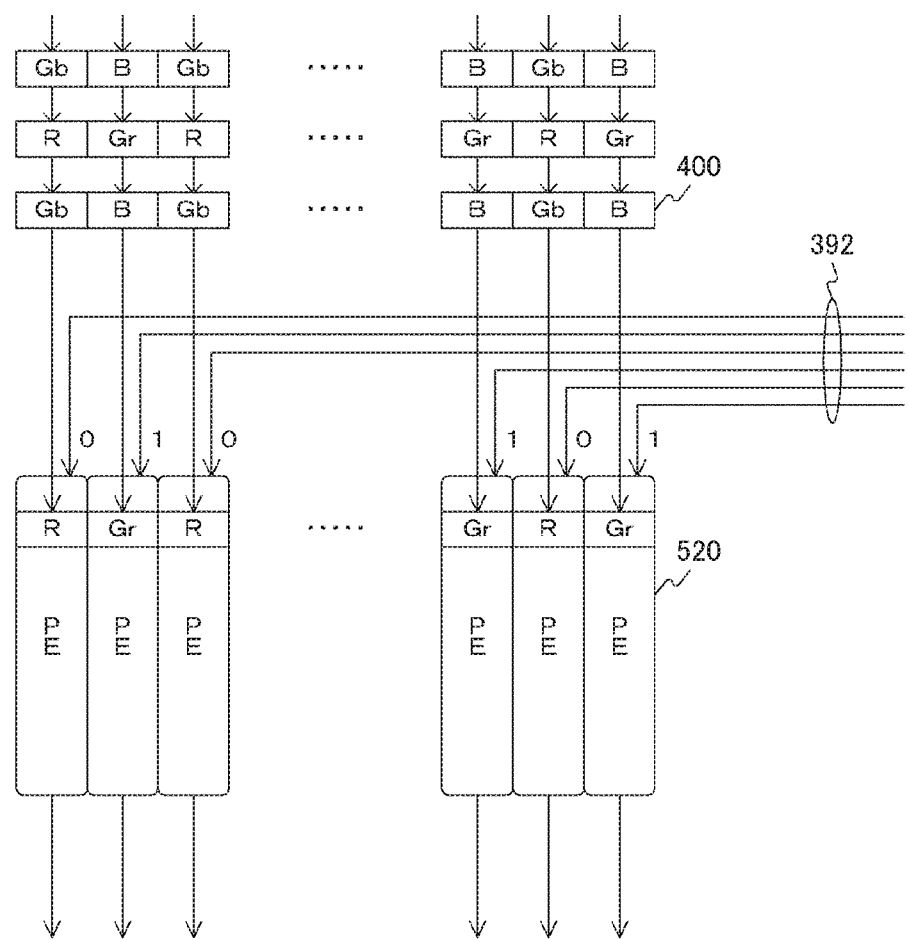
FIG. 10 is an illustration showing an example of switch-over of programs in units of a pixel in an embodiment of the present technology.

FIG. 10 is an illustration showing an example of switch-over of programs in units of a pixel in the embodiment of the present technology. This example shows a situation where image data are supplied from the image sensor 400 to the processing elements 520 for each line. Here, it is supposed that image data are composed of RGB pixels with the Bayer arrangement. That is, certain line data are a line (hereafter, referred to as an R line) composed of the repetition of a red pixel (R) and a green pixel (Gr), and its adjacent line data are a line (hereafter, referred to as a B line) composed of the repetition of a green pixel (Gb) and a blue pixel (B).

In this embodiment, for such image data, a program for the R line and a program for the B line are switched over alternately in units of a line. The program for the R line is a program including the calculation specialized for the pixels of R and Gr. The program for the B line is a program including the calculation specialized for the pixels of B and Gb. The processing elements 520 execute these programs alternately in column parallel in accordance with the control from the instruction control section 300.

At this time, the instruction control section 300 supplies respective independent control signals to the respective processing elements 520 through the signal lines 392. This control signal is a value set in the control register 200, and shows a value different alternately for each column.

For example, at the time of executing the program for the R line, "0" is supplied to the processing elements 520 that make the red pixel (R) a processing target, and "1" is supplied to the processing elements 520 that make a green pixel (Gr) a processing target. In the processing elements 520, both the calculation result specialized for the red pixel (R) and the calculation result specialized for the green pixel (Gr) are calculated, and thereafter, only any one of the calculation results is output in accordance with a control signal.

With respective to the program for the B line, similarly, both the calculation result specialized for the blue pixel (B) and the calculation result specialized for the green pixel (Gb) are calculated, and thereafter, only any one of the calculation results is output in accordance with a control signal. In this way, while executing common programs in column parallel, different outputs can be obtained for each column.

In this connection, in this example, although the control signal supplied to each of the processing elements 520 is made one bit, a plurality of bits may be supplied to each of them. For example, in the case where the control signal is made to two bits, one calculation result can be selected from four calculation results.

Figure 11:
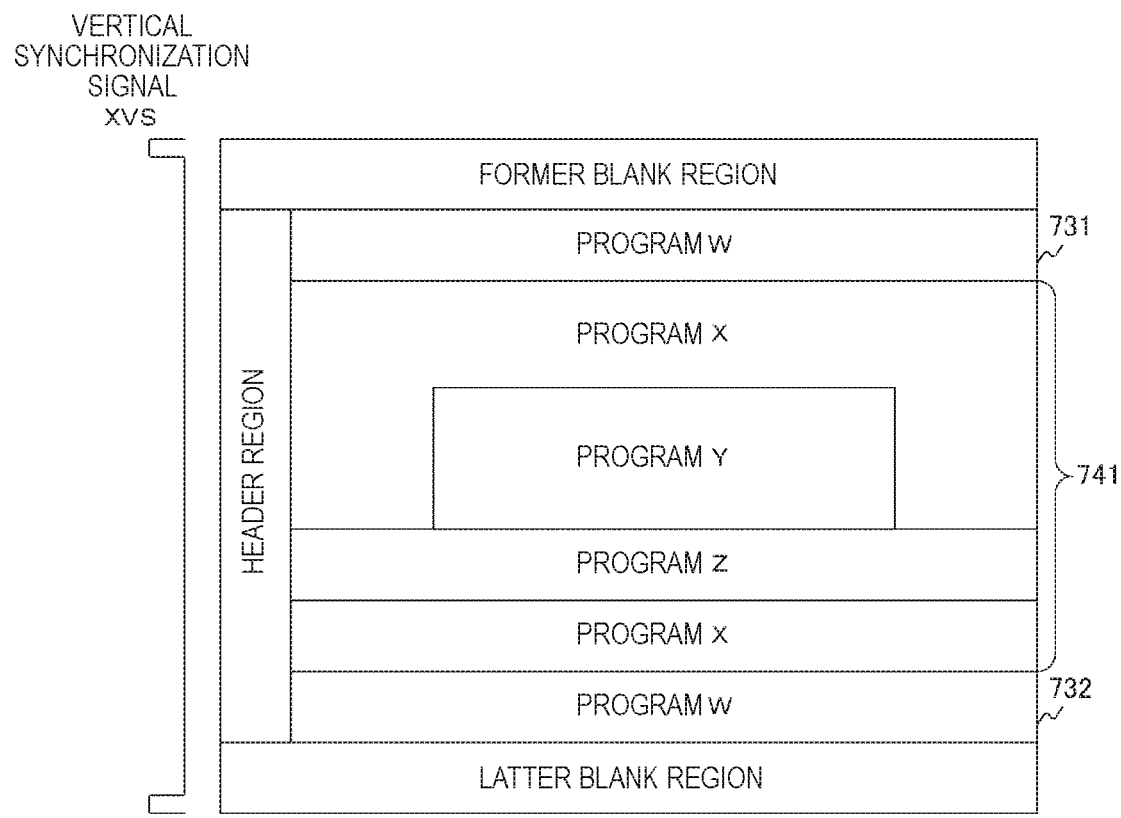
FIG. 11 is an illustration showing a relationship example between a pixel region of a frame becoming a target in an embodiment of the present technology and a program.

FIG. 11 is an illustration showing a relationship example between a pixel region of a frame becoming a target in the embodiment of the present technology and a program.

In the effective pixel region 741, a program X, a program Y, and a program Z can be switched over in units of a line. Moreover, by using the above-mentioned control signal of a column unit, as if a plurality of a program X and a program Y are switched over in one line, a calculation result can be output.

Moreover, depending on a determination result by the line range determining section 350, a dedicated program W can be applied for the OPB regions 731 and 732.

[Concrete Example]

Figure 12:
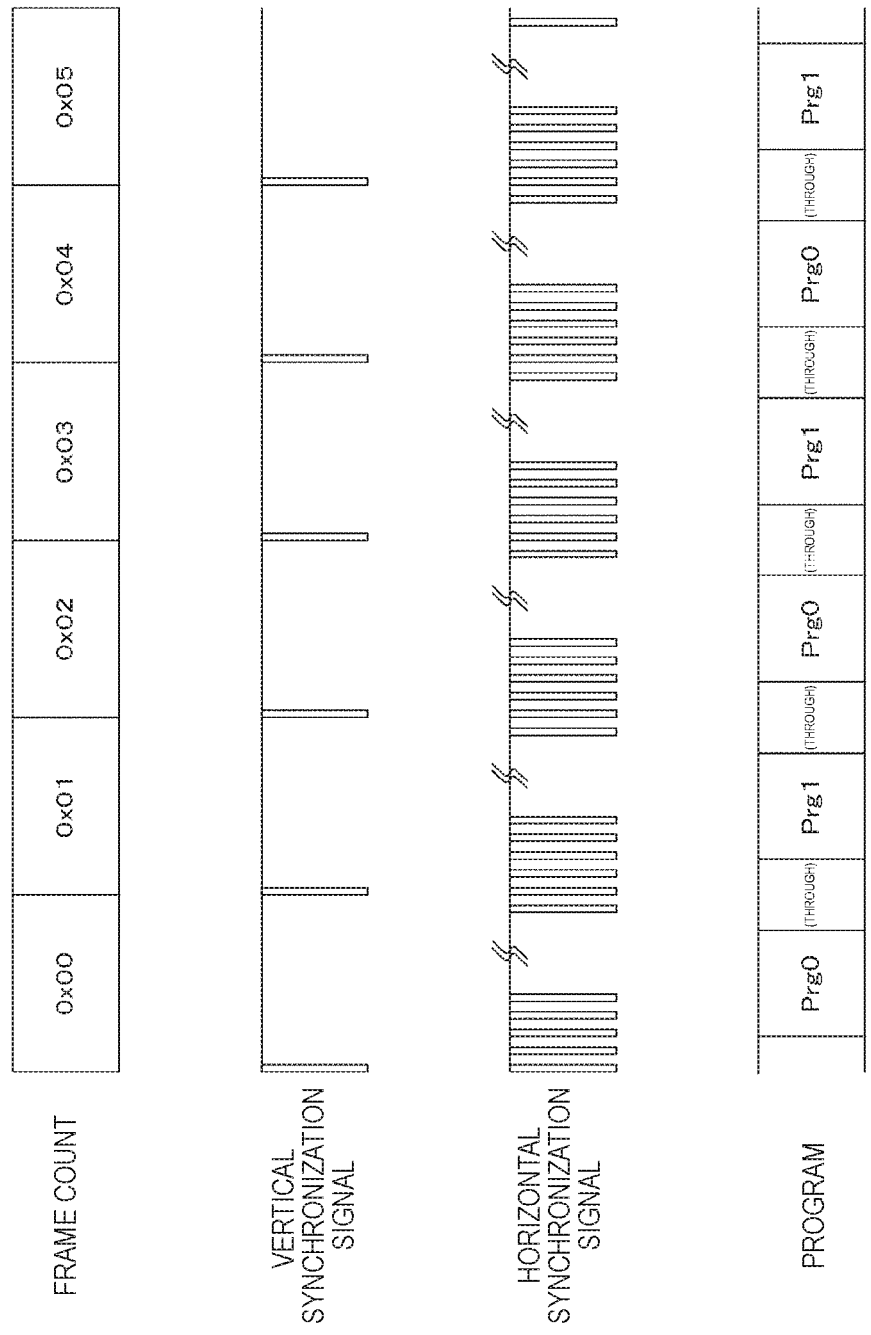
FIG. 12 is an illustration showing the first concrete example of program switch-over in an embodiment of the present technology.

FIG. 12 is an illustration showing the first concrete example of program switch-over in the embodiment of the present technology. In this example, it is supposed that two programs are executed alternately for each frame.

Here, it is assumed that the following values are set in the control register 200. In this connection, a number starting with "0x" indicates that it is a hexadecimal number.
REG_OFS_F0[9:0]=0x0000
REG_OFS_F1[9:0]=0x0100
REG_OFS_F2[9:0]=0x0200
REG_OFS_F3[9:0]=0x0300
REG_PRM_GP_F0[7:0]=0x00
REG_PRM_GP_F1[7:0]=0x01
REG_PRM_GP_F2[7:0]=0x00
REG_PRM_GP_F3[7:0]=0x00
REG_VLDBIT_GP_F0[7:0]=0x00
REG_VLDBIT_GP_F1[7:0]=0x01
REG_VLDBIT_GP_F2[7:0]=0x00
REG_VLDBIT_GP_F3[7:0]=0x00

According to this example, in the case where the least significant bit of a frame count is "0", a program Prg0 is selected, and in the case where the least significant bit of a frame count is "1", a program Prg1 is selected. Therefore, in even frames and odd frames, programs can be switched over alternately.

Figure 13:
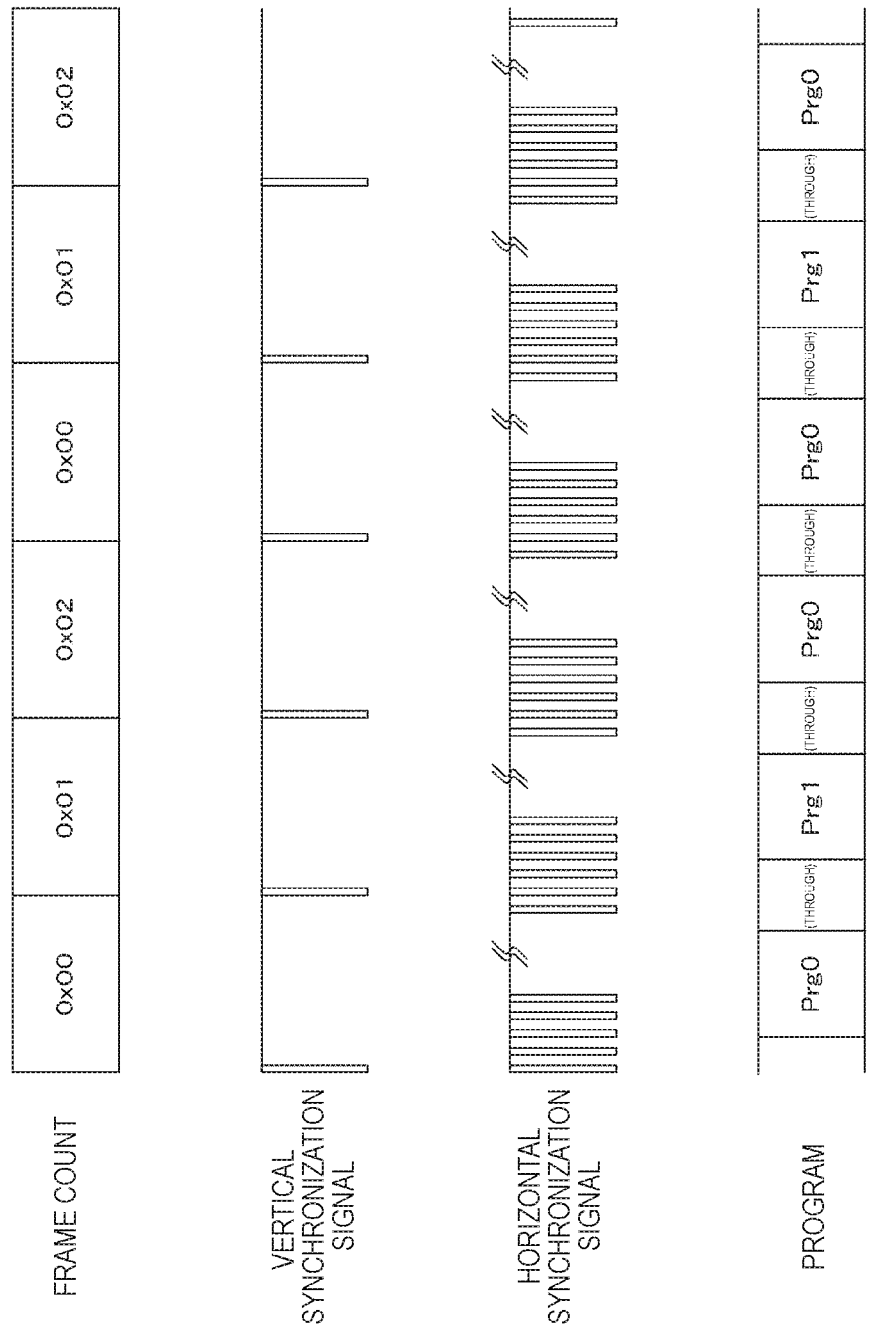
FIG. 13 is an illustration showing the second concrete example of program switch-over in an embodiment of the present technology.

FIG. 13 is an illustration showing the second concrete example of program switch-over in the embodiment of the present technology. In this example, in the case of switching over two programs, it is supposed that while executing one program of them, the other program is executed only one time in three frames.

Here, it is assumed that the following values are set in the control register 200.
REG_OFS_F0[9:0]=0x0000
REG_OFS_F1[9:0]=0x0100
REG_OFS_F2[9:0]=0x0200
REG_OFS_F3[9:0]=0x0300
REG_PRM_GP_F0[7:0]=0x00
REG_PRM_GP_F1[7:0]=0x01
REG_PRM_GP_F2[7:0]=0x00
REG_PRM_GP_F3[7:0]=0x00
REG_VLDBIT_GP_F0[7:0]=0x00
REG_VLDBIT_GP_F1[7:0]=0xFF
REG_VLDBIT_GP_F2[7:0]=0x00
REG_VLDBIT_GP_F3[7:0]=0x00
REG_FCNT_MAX[7:0]=0x02

In this example, the maximum value "REG_FCNT_MAX" of a frame count is set to "2", and the frame count repeats "0", "1", and "2". Then, only when the frame count becomes "1", a program Prg1 is executed, and at the time other than that, a program Prg0 is executed. With this, the program Prg1 can be executed only one time in three frames.

Figure 14:
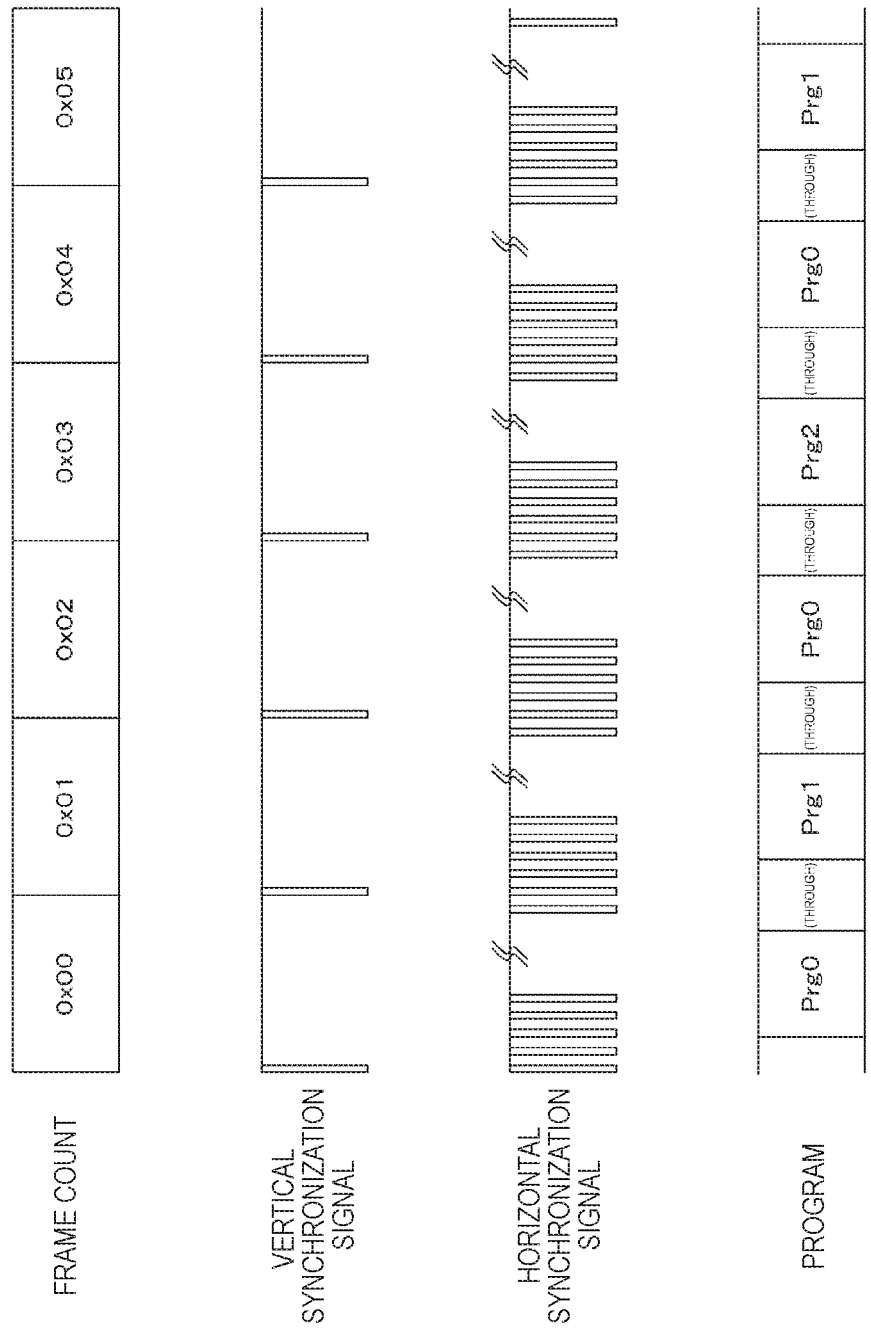
FIG. 14 is an illustration showing the third concrete example of program switch-over in an embodiment of the present technology.

FIG. 14 is an illustration showing the third concrete example of program switch-over in the embodiment of the present technology. In this example, in the case of switching over three programs, while executing a first program for every other frame, each of a second program and a third program is executed for every three frames. That is, the programs are switched over in the order of the first program, the second program, the first program, and the third program.

Here, it is assumed that the following values are set in the control register 200.
REG_OFS_F0[9:0]=0x0000
REG_OFS_F1[9:0]=0x0100
REG_OFS_F2[9:0]=0x0200
REG_OFS_F3[9:0]=0x0300
REG_PRM_GP_F0[7:0]=0x00
REG_PRM_GP_F1[7:0]=0x01
REG_PRM_GP_F2[7:0]=0x03
REG_PRM_GP_F3[7:0]=0x00
REG_VLDBIT_GP_F0[7:0]=0x00
REG_VLDBIT_GP_F1[7:0]=0x01
REG_VLDBIT_GP_F2[7:0]=0x03
REG_VLDBIT_GP_F3[7:0]=0x00

In this example, it is premised that among the conditions F0 to F3, the setting is made so as to select the condition F3 with the highest priority, then F2, then F3, and finally F0. With regard to the condition F2, the condition is established one time in four frames. On the other hand, with regard to the condition F1, the condition is established one time in two frames. However, since the condition F2 is established simultaneously one time in two times among them, as a result, the condition F2 with a higher priority is selected. Moreover, with respect to a frame in which these conditions F1 and F2 are not established, the condition F0 is established. Therefore, the programs can be switched over in the order of the first program, the second program, the first program, and the third program.

In this connection, in the above-mentioned concrete examples, an example of switch-over of programs in units of a frame is shown. However, with regard to switch-over of programs in units of a line, it is possible to apply similarly.

FIG. 15 is an illustration showing the fourth concrete example of program switch-over in the embodiment of the present technology. In this example, switch-over of programs or program entries is performed with respect to each line in one frame. That is, in the case where the frame condition F0 is established, the program of horizontal difference calculation is executed. At that time, in the case where a line condition V0 has been established simultaneously, Sobel filter processing is performed. Moreover, in the case where the frame condition F1 is established, the program of vertical difference calculation is executed. At that time, in the case where a line condition V0 has been established simultaneously, Gaussian filter processing is performed.

Here, it is assumed that the following values are set in the control register 200.
REG_OFS_F0[9:0]=0x0000
REG_OFS_F1[9:0]=0x0100
REG_OFS_V0[9:0]=0x0040
REG_OFS_FOFF=0
REG_OFS_VOFF=0

In this case, in even frames, the horizontal difference calculation is executed with respect to the 0th to thirty-first lines, and the Sobel filter processing is executed with respect to the thirty-second to sixty-third lines. Moreover, from the sixty-fourth line onward, the horizontal difference calculation is executed.

On the other hand, in odd frames, with respect to the 0th to thirty-first lines, vertical difference calculation is executed, and with respect to the thirty-second to sixty-third lines, Gaussian filter processing is executed. Moreover, from the sixty-fourth line onward, the vertical difference calculation is executed.

FIG. 16 is an illustration showing the fifth concrete example of program switch-over in the embodiment of the present technology. In this example, switch-over of programs is performed with respect to each line in one frame. That is, in the above-mentioned fourth concrete example, at the time of establishment of the line condition V0, it is executed from a specific entry within a program. However, also in the case where a line condition is established, the program may be executed from the head. In this example, in the case where the frame condition F0 is established, the program of horizontal difference calculation is executed. In the case where the frame condition F1 is established, the program of vertical difference calculation is executed. Moreover, in the case where the line condition V0 is established simultaneously, Gaussian filter processing is performed.

Here, it is assumed that the following values are set in the control register 200.

REG_OFS_F0[9:0]=0x0000
REG_OFS_F1[9:0]=0x0100
REG_OFS_V0[9:0]=0x0200
REG_OFS_FOFF=1
REG_OFS_VOFF=0

In this case, since "REG_OFS_FOFF" is set to "1", in the case where a line condition and a frame condition are established simultaneously, the offset address of the frame condition is made to non-addition. As a result, in even frames, horizontal difference calculation is executed with respect to the 0th to thirty-first lines, and the Gaussian filter processing is performed with respect to the thirty-second to sixty-third lines. Moreover, from the sixty-fourth line onward, the horizontal difference calculation is executed.

On the other hand, in odd frames, the vertical difference calculation is executed with respect to the 0th to thirty-first lines, and the Gaussian filter processing is performed with respect to the thirty-second to sixty-third lines. Moreover, from the sixty-fourth line onward, the vertical difference calculation is executed.

3. Application Example

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

Figure 17:
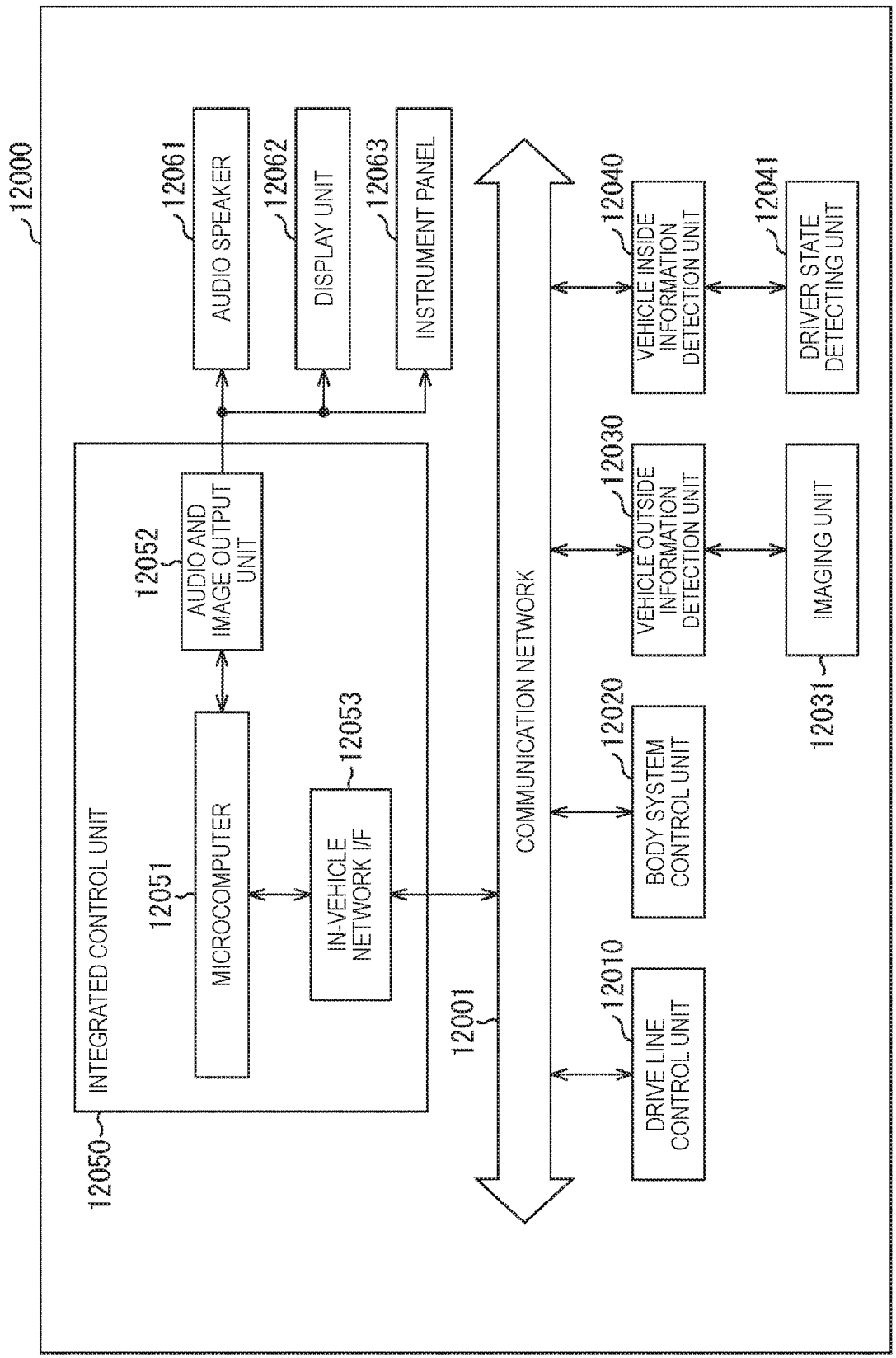
FIG. 17 is a block diagram illustrating a schematic configuration example of a vehicle control system.

FIG. 17 is a block diagram illustrating a schematic configuration example of a vehicle control system which is an example of a mobile object control system to which a technology according to an embodiment of the present technology is applicable.

A vehicle control system 12000 includes a plurality of electronic control units connected via a communication network 12001. In the example illustrated in FIG. 17, the vehicle control system 12000 includes a drive line control unit 12010, a body system control unit 12020, a vehicle outside information detection unit 12030, a vehicle inside information detection unit 12040, and an integrated control unit 12050. In addition, as functional configurations of the integrated control unit 12050, a microcomputer 12051, an audio and image output unit 12052, an in-vehicle network interface (I/F) 12053.

The drive line control unit 12010 controls the operation of devices related to the drive line of the vehicle in accordance with a variety of programs. For example, the drive line control unit 12010 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like.

The body system control unit 12020 controls the operations of a variety of devices attached to the vehicle body in accordance with a variety of programs. For example, the body system control unit 12020 functions as a control device for a keyless entry system, a smart key system, a power window device, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 receives these radio waves or signals, and controls the vehicle door lock device, the power window device, the lights, or the like.

The vehicle outside information detection unit 12030 detects information regarding the outside of a vehicle on which the vehicle control system 12000 is mounted. For example, an imaging unit 12031 is connected to the vehicle outside information detection unit 12030. The vehicle outside information detection unit 12030 causes the imaging unit 12031 to capture an image outside of the vehicle and receives the captured image. The vehicle outside information detection unit 12030 may perform an object detection process or a distance detection process for a person, a vehicle, an obstacle, a sign, letters on a road, or the like on the basis of the received image.

The imaging unit 12031 is a light sensor that receives light and outputs an electric signal in accordance with the amount of received light. The imaging unit 12031 can output the electric signal as an image or distance measurement information. In addition, the light received by the imaging unit 12031 may be the visible light or may be non-visible light such as infrared light.

The vehicle inside information detecting unit 12040 detects information on the inside of the vehicle. The vehicle inside information detecting unit 12040 is connected, for example, to a driver state detecting unit 12041 that detects the state of the driver. The driver state detecting unit 12041 may include, for example, a camera that images the driver. The vehicle inside information detecting unit 12040 may compute the degree of the driver's tiredness or the degree of the driver's concentration or determine whether the driver have a doze, on the basis of detection information input from the driver state detecting unit 12041.

For example, the microcomputer 12051 can calculate a control target value of the driving force generating device, the steering mechanism, or the braking device on the basis of information acquired by the vehicle outside information detecting unit 12030 or the vehicle inside information detecting unit 12040 on the inside and outside of the vehicle, and output a control instruction to the drive line control unit 12010. For example, the microcomputer 12051 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like.

Further, the microcomputer 12051 can control the driving force generating device, the steering mechanism, the braking device, or the like on the basis of information acquired by the vehicle outside information detecting unit 12030 or the vehicle inside information detecting unit 12040 on the areas around the vehicle, thereby performing cooperative control for the purpose of automatic driving or the like that allows the vehicle to autonomously travel irrespective of any operation of a driver.

In addition, the microcomputer 12051 can output a control instruction to the body system control unit 12020 on the basis of the information regarding the outside of the vehicle acquired by the vehicle outside information detection unit 12030. For example, the microcomputer 12051 can control a head lamp in accordance with the position of a preceding vehicle or an oncoming vehicle detected by the vehicle outside information detection unit 12030 and can perform cooperative control for the purpose of anti-glaring such as switching a high beam to a low beam.

The audio and image output unit 12052 transmits an output signal of at least one of a sound and an image to an output device capable of visually or aurally notifying a passenger of the vehicle or the outside of the vehicle of information. In the example of FIG. 17, an audio speaker 12061, a display unit 12062, and an instrument panel 12063 are exemplified as the output device. For example, the display unit 12062 may include at least one of an onboard display and a head-up display.

Figure 18:
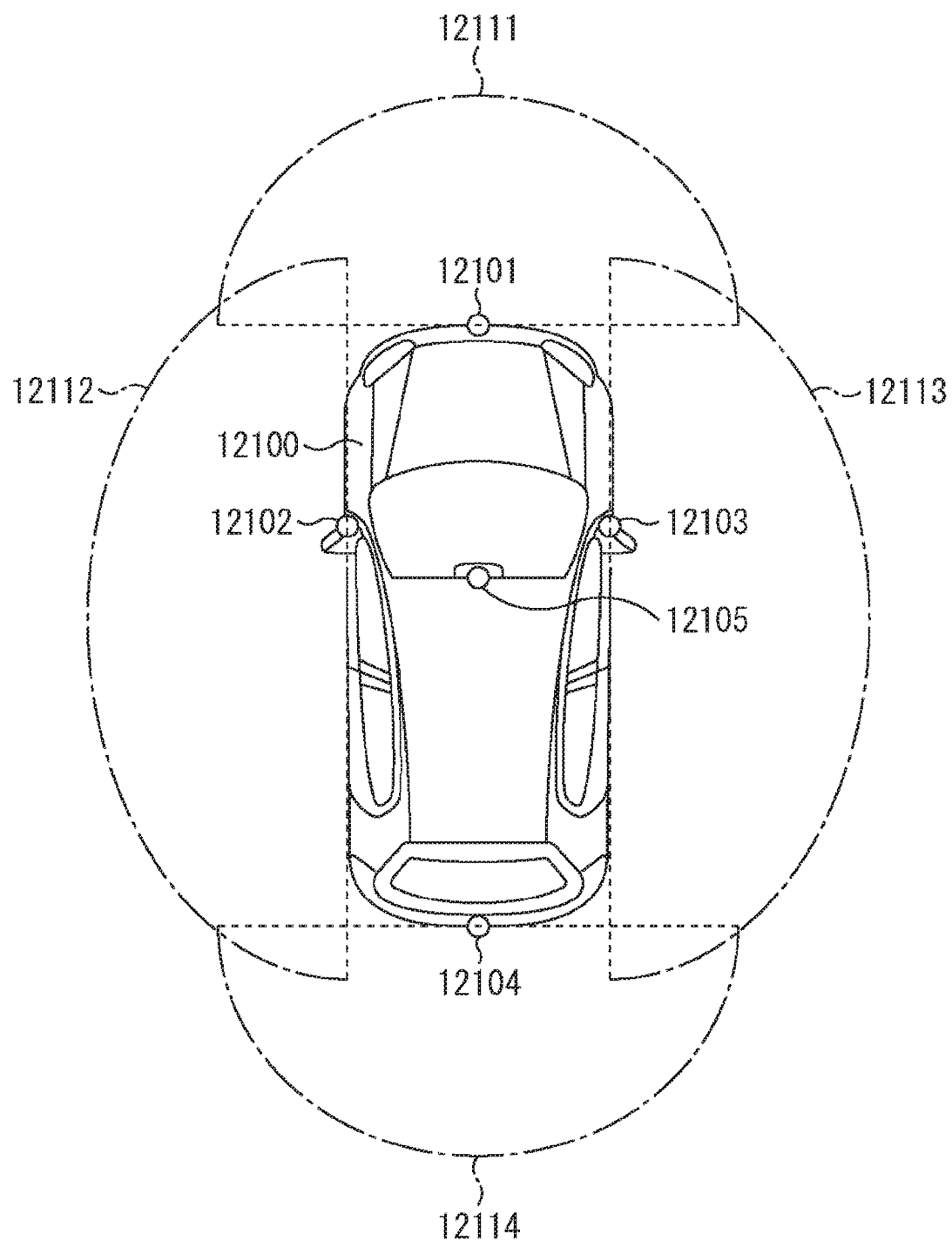
FIG. 18 is a diagram illustrating an example of an installation position of an imaging unit.

FIG. 18 is a diagram illustrating an example of an installation position of the imaging unit 12031.

In FIG. 89, the imaging unit 12031 includes imaging units 12101, 12102, 12103, 12104, and 12105.

Imaging units 12101, 12102, 12103, 12104, and 12105 are positioned, for example, at the front nose, a side mirror, the rear bumper, the back door, and the upper part of the windshield in the vehicle compartment of a vehicle 12100. The imaging unit 12101 attached to the front nose and the imaging unit 12105 attached to the upper part of the windshield in the vehicle compartment chiefly acquire images of the area ahead of the vehicle 12100. The imaging units 12102 and 12103 attached to the side mirrors chiefly acquire images of the areas on the sides of the vehicle 12100. The imaging unit 12104 attached to the rear bumper or the back door chiefly acquires images of the area behind the vehicle 12100. The imaging unit 12105 attached to the upper part of the windshield in the vehicle compartment is used chiefly to detect a preceding vehicle, a pedestrian, an obstacle, a traffic light, a traffic sign, a lane, or the like.

Additionally, FIG. 18 illustrates an example of the imaging ranges of the imaging units 12101 to 12104. An imaging range 12111 represents the imaging range of the imaging unit 12101 attached to the front nose. Imaging ranges 12112 and 12113 respectively represent the imaging ranges of the imaging units 12102 and 12103 attached to the side mirrors. An imaging range 12114 represents the imaging range of the imaging unit 12104 attached to the rear bumper or the back door. For example, overlaying image data captured by the imaging units 12101 to 12104 offers an overhead image that looks down on the vehicle 12100.

At least one of the imaging units 12101 to 12104 may have a function of acquiring distance information. For example, at least one of the imaging units 12101 to 12104 may be a stereo camera including a plurality of image sensors or may be an image sensor that includes pixels for phase difference detection.

For example, the microcomputer 12051 can extract a 3-dimensional object traveling at a predetermined speed (for example, 0 or more km/h) in substantially the same direction as the vehicle 12100 as a preceding vehicle by particularly using a closest 3-dimensional object on a travel road of the vehicle 12100 by obtaining a distance to each 3-dimensional object within the imaging ranges 12111 to 12114 and a temporal change in the distance (a relative speed to the vehicle 12100) on the basis of distance information obtained from the imaging units 12101 to 12104. Further, the microcomputer 12051 can set an inter-vehicle distance to be ensured in advance before a preceding vehicle and perform automatic brake control (also including follow-up stop control) or automatic acceleration control (also including follow-up oscillation control). In this way, it is possible to perform cooperative control for the purpose of automatic driving or the like that allows the vehicle to autonomously travel irrespective of any operation of a driver.

For example, the microcomputer 12051 can classify and extract 3-dimensional object data regarding 3-dimensional objects as other 3-dimensional objects such as motorcycles, normal vehicles, large vehicles, pedestrians, and electric poles on the basis of the distance information obtained from the imaging units 12101 to 12104 and can use the other 3-dimensional objects to automatically avoid obstacles. For example, the microcomputer 12051 identifies obstacles around the vehicle 12100 as obstacles which can be viewed by a driver of the vehicle 12100 and obstacles which are difficult to view. Then, the microcomputer 12051 can determine a collision risk indicating a danger of collision with each obstacle and output a warning to the driver via the audio speaker 12061 or the display unit 12062 in a situation in which there is a collision possibility since the collision risk is set to be equal to or greater than a set value or can perform driving assistance for collision avoidance by performing forced deceleration or avoidance steering iv via the drive line control unit 12010.

At least one of the imaging units 12101 to 12104 may be an infrared camera that detects infrared light. For example, the microcomputer 12051 can recognize a pedestrian by determining whether there is the pedestrian in captured images of the imaging units 12101 to 12104. The pedestrian can be recognized, for example, in a procedure in which feature points are extracted in the captured images of the imaging units 12101 to 12104 serving as infrared cameras and a procedure in which a series of feature points indicating a contour of an object are subjected to a pattern matching process to determine whether there is the pedestrian. The microcomputer 12051 determines that there is the pedestrian in the captured images of the imaging units 12101 to 12104. When the pedestrian is recognized, the audio and image output unit 12052 controls the display unit 12062 such that a rectangular contour line for emphasis is superimposed to be displayed on the recognized pedestrian. In addition, the audio and image output unit 12052 controls the display unit 12062 such that an icon or the like indicating the pedestrian is displayed at a desired position.

An example of the vehicle control system to which the technology according to the present disclosure can be applied has been described above. The technology according to the present disclosure can be applied to the imaging unit 12031 within the above-described configuration. In concrete terms, in a pixel region within a frame of pixel data imaged in the imaging unit 12031, the calculation contents are switched over in robustness, whereby it becomes possible to realize the above-mentioned automatic driving and driving assistance.

In this way, according to this embodiment, the programs or program entries executed in the processing elements 520 can be switched over in units of a frame or in units of a line. Moreover, depending on whether a line becoming a target is included in an effective pixel region, programs can be switched over.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

Note that the effects described in the present specification are not limiting but are merely examples, and there may be other effects.

Additionally, the present technology may also be configured as below.

(1)
An image data processing circuit including:
a plurality of processing elements that processes line data included in image data in parallel; and
an instruction control section that selects one of a plurality of programs correspondingly to a line count of the line data and supplies an instruction sequence of the selected program to the plurality of processing elements.

(2)
The image data processing circuit according to (1), in which the instruction control section supplies each independent control signal to the plurality of processing elements, and
the plurality of processing elements outputs an execution result coincident with a control content of the control signal among an execution result of the selected program.

(3)
The image data processing circuit according to (1) or (2), in which the instruction control section includes
a line condition determining section that determines for each of the line counts with respect to each of the plurality of programs whether to satisfy a condition to supply the instruction sequence, and
a line condition selecting section that selects one program in accordance with a predetermined priority order in a case where at least two of the plurality of programs satisfy the condition in the line condition determining section.

(4)
The image data processing circuit according to (3), in which the line condition determining section performs the determination by using some of bits of the line count expressed with the bits.

(5)
The image data processing circuit according to any of (1) to (4), in which the instruction control section determines with respect to the line count whether to be within an effective pixel region, and selects one of the plurality of programs correspondingly to a determination result.

(6)
The image data processing circuit according to any of (1) to (5), in which the image data are a frame included in moving image data input in time series, and
the instruction control section selects one of a plurality of programs correspondingly to a frame count in the moving image data, and supplies an instruction sequence of the selected program to the plurality of processing elements.

(7)
The image data processing circuit according to (6), in which the instruction control section includes a frame condition determining section that determines for each of the frame counts with respect to each of the plurality of programs whether to satisfy a condition to supply the instruction sequence; and
a frame condition selecting section that selects one program in accordance with a predetermined priority order in a case where at least two of the plurality of programs satisfy the condition in the frame condition determining section.

(8)
The image data processing circuit according to (7), in which the frame condition determining section performs the determination by using some of bits of the frame count expressed with the bits.

(9)
An imaging apparatus including:
an image sensor that generates image data by photoelectrically converting light from an object; and
an image data processing circuit including a plurality of processing elements that processes line data included in the image data in parallel, and an instruction control section that selects one of a plurality of programs correspondingly to a line count of the line data and supplies an instruction sequence of the selected program to the plurality of processing elements.

REFERENCE SIGNS LIST 100 system control section
200 control register
300 instruction control section
310 frame counter
311 flip-flop
312 adder
313 enabler
314 comparator
315 logical sum gate
320 line counter
321 flip-flop
330 frame condition determining section
331 comparison section
332 negative exclusive logical sum (XNOR) gate
333 logical multiply gate
334 coincidence detecting section
335 logical sum gate
336 logical multiply gate
340 line condition determining section
341 comparison section
350 line range determining section
351 flip-flop
352 logical sum gate
361 to 364, 367, selector
365 addition advisability determining section
366 offset adder
370 instruction memory
380 instruction decoder
400 image sensor
500 signal processing section
510, 530 line buffer
520 processing element
600 image processing section

The invention claimed is:
1. An image data processing circuit, comprising:
a plurality of processing elements configured to process line data in image data in parallel; and
an instruction control section configured to:
select a program of a plurality of programs corresponding to a line count of the line data, wherein the selected program is executable by the plurality of processing elements to process the line data; and supply an instruction sequence of the selected program to the plurality of processing elements, wherein the instruction control section includes:

a line condition determining section configured to determine, for each of a plurality of line counts with respect to each of the plurality of programs, whether a first condition to supply the instruction sequence is satisfied; and a line condition selecting section configured to select the program in accordance with a determined priority order in a case where at least two programs of the plurality of programs satisfy the first condition.

2. The image data processing circuit according to claim 1, wherein the instruction control section is further configured to supply a control signal to the plurality of processing elements, and the plurality of processing elements is further configured to output an execution result coincident with a control content of the control signal.

3. The image data processing circuit according to claim 1, wherein the line condition determining section is further configured to determine whether the first condition is satisfied based on bits of the line count expressed with the bits.

4. The image data processing circuit according to claim 1, wherein the instruction control section is further configured to:

determine, with respect to the line count, whether to be within an effective pixel region; and select the program of the plurality of programs corresponding to a determination result.

5. The image data processing circuit according to claim 1, wherein the image data comprises a frame included in moving image data input in time series, and the instruction control section is further configured to:

select the program of the plurality of programs corresponding to a frame count in the moving image data; and supply the instruction sequence of the selected program to the plurality of processing elements.

6. The image data processing circuit according to claim 5, wherein the instruction control section further includes:

a frame condition determining section configured to determine, for each of a plurality of frame counts with respect to each of the plurality of programs, whether a second condition to supply the instruction sequence is satisfied; and a frame condition selecting section configured to select the program in accordance with a determined priority order in a case where the at least two programs of the plurality of programs satisfy the second condition in the frame condition determining section.

7. The image data processing circuit according to claim 6, wherein the frame condition determining section is further configured to determine whether the second condition is satisfied bits of the frame count expressed with the bits.

8. An imaging apparatus, comprising:

an image sensor configured to generate image data by photoelectrically conversion of light from an object; and an image data processing circuit including:

a plurality of processing elements configured to process line data included in the image data in parallel; and an instruction control section configured to:

select a program of a plurality of programs corresponding to a line count of the line data, wherein the selected program is executable by the plurality of processing elements to process the line data; and supply an instruction sequence of the selected program to the plurality of processing elements;

wherein the instruction control section includes:

a line condition determining section configured to determine, for each of a plurality of line counts with respect to each of the plurality of programs, whether a condition to supply the instruction sequence is satisifed; and a line condition selecting section configured to select the program in accordance with a determined priority order in a case where at least two programs of the plurality of programs satisfy the condition.

* * * * *